United States Patent
Zimmermann et al.

(10) Patent No.: US 6,910,518 B2
(45) Date of Patent: Jun. 28, 2005

(54) DIVIDED WINDOW SHADE ARRANGEMENT FOR MOTOR VEHICLES

(75) Inventors: Gerald Zimmermann, Ottenbach (DE); Herbert Walter, Ebersbach (DE); Henning Sparrer, Notzingen (DE)

(73) Assignee: BOS GmbH & Co. KG, Ostfildern (DE)

(*) Notice: Subject to any disclaimer, the term of this patent is extended or adjusted under 35 U.S.C. 154(b) by 9 days.

(21) Appl. No.: 10/278,628

(22) Filed: Oct. 23, 2002

(65) Prior Publication Data
US 2003/0094249 A1 May 22, 2003

(30) Foreign Application Priority Data
Oct. 24, 2001 (DE) .......................... 101 51 872

(51) Int. Cl.[7] .................................. B60J 1/20
(52) U.S. Cl. ........................ 160/370.22; 160/370.21; 296/97.7
(58) Field of Search ............... 160/370.22, 370.21, 160/37.23, 370.23; 296/97.7, 97.8, 97.9, 97.4, 152

(56) References Cited

U.S. PATENT DOCUMENTS

| | | | | |
|---|---|---|---|---|
| 3,050,075 A | * | 8/1962 | Kaplan et al. | 296/98 |
| 4,874,026 A | * | 10/1989 | Worrall | 160/23.1 |
| 5,033,527 A | * | 7/1991 | Ouvrard et al. | 160/310 |
| 6,347,825 B2 | * | 2/2002 | Seel et al. | 296/97.8 |
| 6,547,307 B2 | * | 4/2003 | Schlecht et al. | 296/97.4 |
| 6,598,929 B2 | * | 7/2003 | Schlecht et al. | 296/97.4 |
| 6,695,381 B2 | * | 2/2004 | Schlecht et al. | 296/97.4 |
| 2001/0017194 A1 | * | 8/2001 | Schlecht et al. | 160/370.22 |
| 2002/0033244 A1 | | 3/2002 | Schlet et al. | |
| 2002/0059986 A1 | * | 5/2002 | Schlecht et al. | 160/120 |
| 2002/0059989 A1 | * | 5/2002 | Schlecht et al. | 160/265 |
| 2002/0092630 A1 | * | 7/2002 | Kremer et al. | 180/370.22 |
| 2003/0066615 A1 | * | 4/2003 | Bong | 160/370.22 |
| 2004/0069425 A1 | * | 4/2004 | Hansen et al. | 160/370.22 |

FOREIGN PATENT DOCUMENTS

| | | |
|---|---|---|
| DE | 10 05 970 | 7/1954 |
| DE | 299 21 859 U1 | 8/2000 |
| DE | 299 21 860 U1 | 8/2000 |
| EP | 1 129 871 A1 | 9/2001 |
| EP | 1 188 591 A1 | 3/2002 |
| FR | 2 786 809 A1 | 6/2000 |

* cited by examiner

Primary Examiner—Bruce A. Lev
(74) Attorney, Agent, or Firm—Leydig, Voit & Mayer, Ltd

(57) ABSTRACT

A double window shade arrangement for a divided window of a motor vehicle, the window shade arrangement includes two separate winding shafts that are arranged on the window at arbitrary angles relative to one another. Window shade strips assigned to the respective winding shafts are moved in at least one direction with the aid of a common driving motor. For this purpose, the electric motor can be coupled to the free edges of the window shade strips or directly coupled to the winding shafts.

29 Claims, 6 Drawing Sheets

DIVIDED WINDOW SHADE ARRANGEMENT FOR MOTOR VEHICLES

FIELD OF THE INVENTION

The present invention relates generally to window shades, and more particularly, to window shades for use with motor vehicle windows.

BACKGROUND OF THE INVENTION

A window shade arrangement for windows in doors of motor vehicles is known from DE 10 05 970. The window shade arrangement described in this patent publication contains a winding shaft that is rotatably supported underneath the window apron and to which one edge of a window shade strip is attached. The opposite edge of the window shade strip is arranged on a pull rod with the window shade strip extending through a slot in the lower window apron when it is unwound. The window shade strip is wound up on the winding shaft with the aid of a spring drive and unwound from the winding shaft with the aid of two linear thrust elements that are sufficiently buckle-proof.

The thrust elements are advanced with the aid of a motor that is accommodated in the door. The thrust elements are driven by means of so-called SUFLEX7 shafts that consist of flexible shaft-like elements with a screw thread on their outer side. Consequently, these shafts represent screw-shaped racks that positively engage with an output gear of a drive motor. Both thrust elements are driven synchronously. In another embodiment disclosed in this publication, the pull rod is guided in guide rails on one or both sides, and the thrust elements run in the guide rail while being guided in a buckle-proof fashion.

It is known that the rear side windows of motor vehicles also can be opened. However, these windows usually cannot be opened over their entire length because the lowered window would otherwise collide with the recess in the door that corresponds to the wheel well. This is the reason why rear side windows are usually divided into an essentially rectangular part and a part that, in the broadest sense, has a generally triangular shape. The window in the rectangular part can be lowered while the window in the triangular part cannot be opened.

In this window shade arrangement, the window shade strip covers both window sections. This type of coverage of both sections requires a certain window geometry. The construction is only suitable for extremely large side windows of very large rear doors. However, one also has to take into account that the interior of such doors is notoriously short of space due to the numerous functions implemented in modern car doors.

OBJECTS AND SUMMARY OF THE INVENTION

It is an object of the present invention to provide a window shade arrangement for large divided windows of motor vehicles which does not require a significant increase in the space requirement for the drive.

In carrying out the invention, the window shade arrangement contains two separate winding shafts that are separately mounted on the window. A separate window shade strip is connected to each winding shaft such that different strip lengths and/or winding directions can be realized.

In order to reduce the space requirement within the door, a common drive unit is provided for both winding shafts. This drive unit moves both window shade strips collectively, either in the direction in which they are unwound or in the direction in which they are wound up. The movement in the respective opposite direction is accomplished by a drive unit which is specific to the respective window shade strip or winding shaft. In this context, the term "collectively" refers to a common drive unit in the mechanical sense in which mechanical parts of the drive unit are used for both window shade strips.

When using the means for actuating the window shade strip, this refers to the means in which the force is introduced into the winding shaft in order to set the shaft in rotation, as well as the means in which the force is introduced at the free end of the window shade strip. In the latter instance, a common drive motor is provided which drives corresponding linear actuating elements. These actuating elements may consist of cable pulls or linear thrust elements that are either sufficiently buckle-proof or guided in a buckle-proof fashion. All linear actuating elements are driven by a common electric motor.

If the force for unwinding the window shade strip, i.e., the force for setting the winding shaft in rotation in the unwinding direction, is introduced to the free edge of the window shade strip, the drive unit for the opposite direction of rotation preferably consists of respective spring drives. However, the same reduction in the space requirement is also achieved if both winding shafts are driven by a common electric motor. Linear actuating elements that are coupled to spring elements also can be used for unwinding the window shade strip in this case.

According to another aspect of the invention, a gear that converts the rotational movement of the winding shaft into a linear movement may be coupled to one of the winding shafts. The output element of this gear engages the free edge of the window shade strip of the other winding shaft so as to synchronously move both window shade strips in this fashion.

Other objects and advantages of the invention will become apparent upon reading the following detailed description and upon reference to the drawings, in which:

Figure 1:
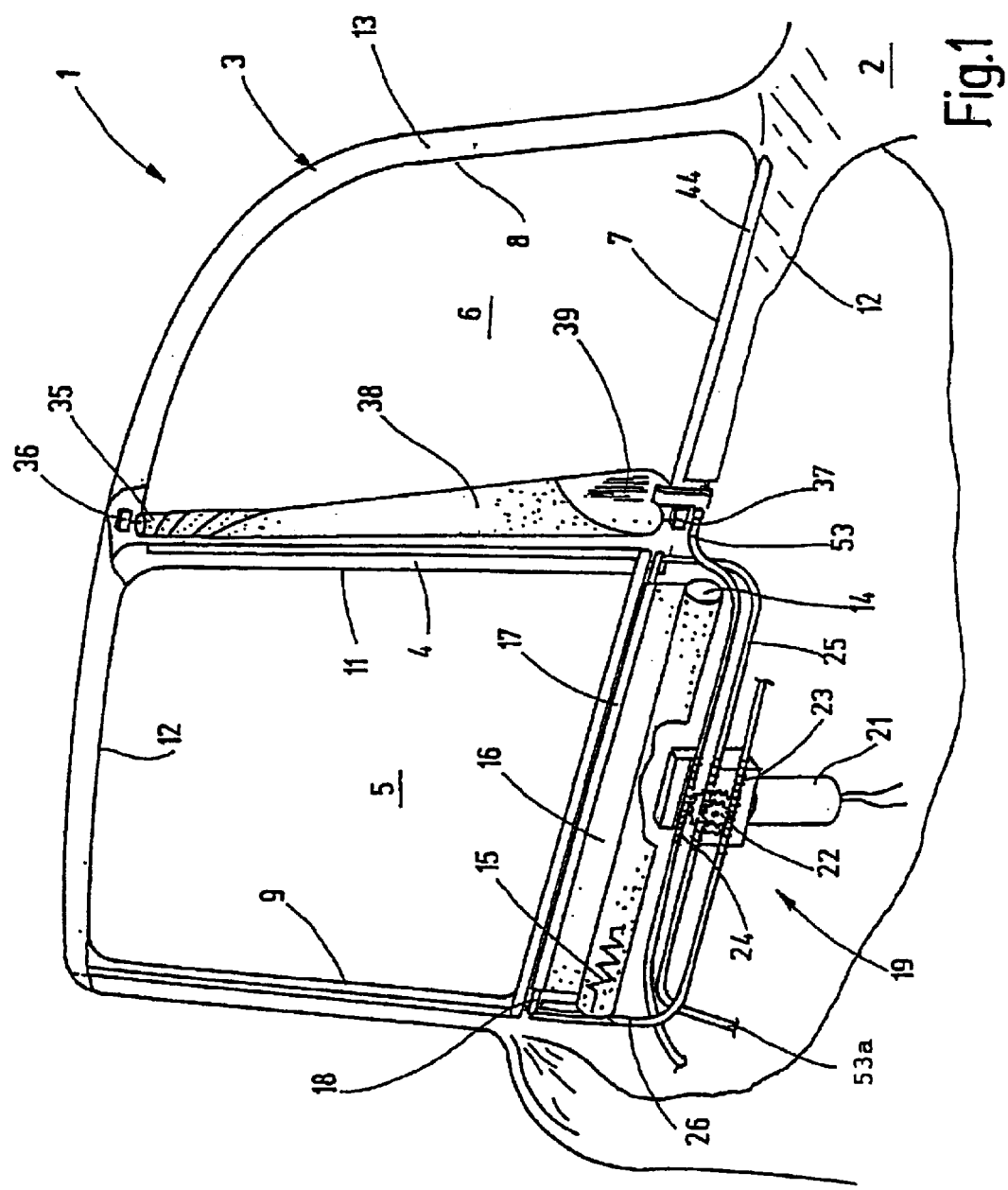
FIG. 1 is a schematic perspective of the right rear side of the door of a motor vehicle having a window shade arrangement in accordance with the invention, showing the shades in their open position.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to FIG. 1 of the drawings, there is shown the rear right side door 1 of a motor vehicle, such as a limousine, as viewed from the passenger compartment. The door 1 has an inner liner 2, which is depicted partially in section, to better illustrate the invention. The upper region of the door 1 has a window that is surrounded by a window frame 3 and is divided into a front window section 5 and a rear window section 6 by a center strip 4. The rear window section 6 is defined by a lower window edge 7, a curved rear window edge 8 and a straight window edge that extends vertically and is covered by other parts of the door. The rear window section 6, in the broadest sense, has an approximately triangular shape.

The front window section 5 has a largely rectangular shape, the front and rear of which are respectively defined by a window edge 9 and a window edge 11, with the top of this section being defined by an upper window edge 12, while the lower window edge, which is covered in FIG. 1, extends approximately along an extension of the lower window edge 7.

Adjacent to the lower window edge 7, the door liner 2 forms a window apron 12 underneath the lower window edge 7 and to the left of the window section 5. The window frame 3 also is covered with an inside trim 13, which is shown sectioned at selected locations in order to better illustrate the invention.

A winding shaft 14 is rotatably supported underneath the window section 5. The axis of the winding shaft 14 extends approximately parallel to the lower window edge of the window section 5. It will be understood that the winding shaft 14 is supported by appropriate bearings.

The winding shaft 14 is pre-tensioned in a rotating direction by means of a coil spring that serves as a spring drive 15. For this purpose, the spring drive 15 is conventionally arranged in the tubular winding shaft 14 and is coupled to the winding shaft 14 at one end. The other end of the spring drive 15 is appropriately anchored in the adjacent bearing block for the winding shaft 14.

One edge of a window shade strip 16 is attached to the winding shaft 14, while the other free edge 17 of the window shade strip that is not connected to the winding shaft 14 is shaped into a tubular loop. A pull rod 18 extends through this loop, with ends of the pull rod 18 projecting in opposite ends of the loop. The window shade strip 16 is cut to size such that it completely covers the window section 15 when in an extended condition. When the window shade strip 16 is extended, it preferably extends through an appropriate slot of the inner door liner 2.

Figure 3:
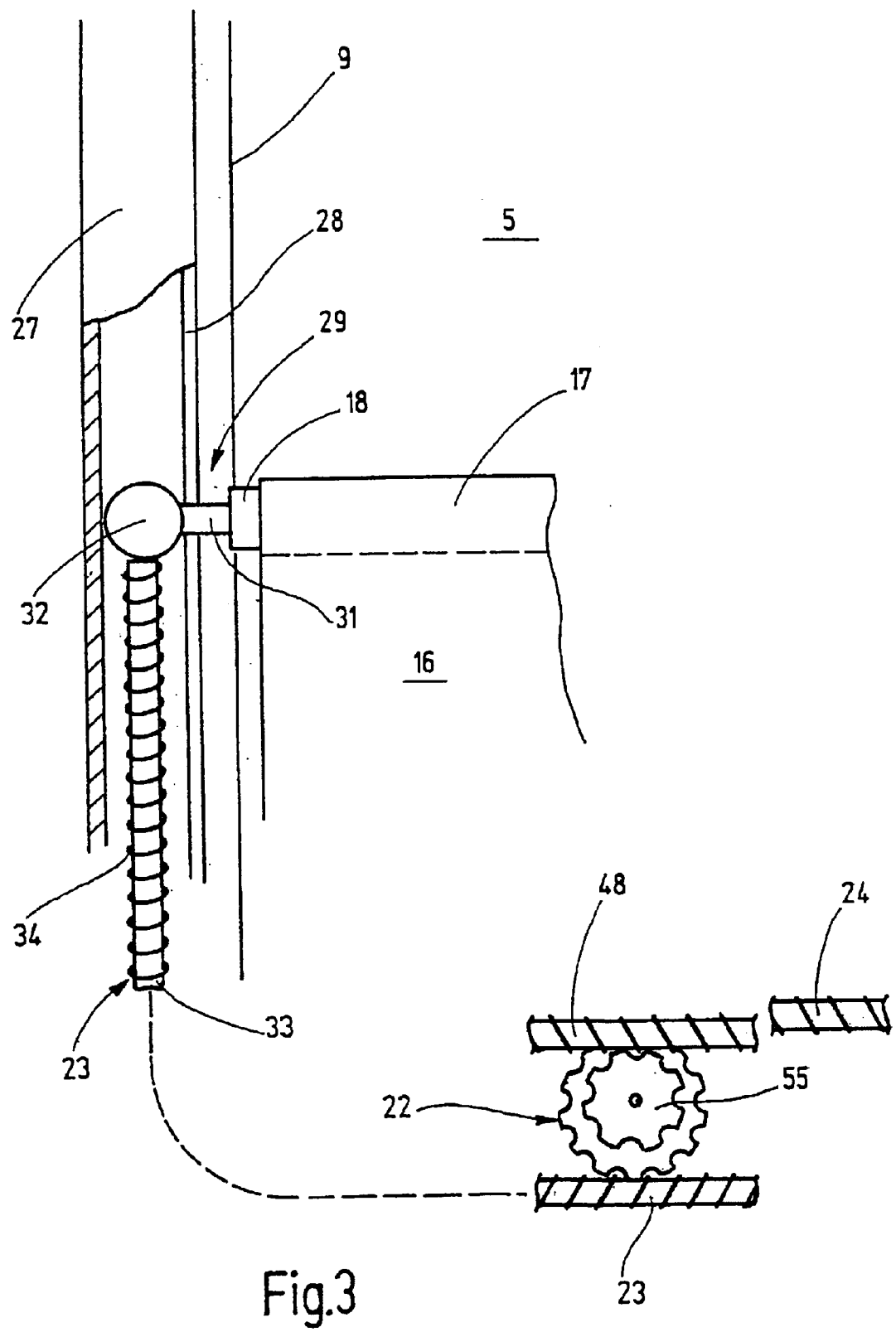
FIG. 3 is an enlarged fragmentary section of a pull rod guide and actuating member for the generally rectangular window shade shown in FIG. 2.

In order to unwind the window shade strip 16 from the winding shaft 14 against the force of the spring drive 15, a drive unit 19 is provided. The drive unit 19 comprises a drive motor 21 which drives a toothed wheel 22. Opposite sides of the toothed wheel 22 mesh with two SUFLEX shafts 23, 24 that serve as flexible thrust elements and extend tangentially past the toothed wheel 22 in corresponding guide channels. Guide tubes 25, 26 are connected to the left and right side of the drive motor housing, the two thrust elements 23, 24 being guided by said guide tubes 25, 26, which end near the end of the pull rod 18 shortly beneath the lower edge of the window section 5 in a buckle-proof fashion. FIG. 3 shows an enlarged representation of the guide for the pull rod 18, as well as-the design of the thrust elements 23 and their cooperation with the pull rod 18.

Underneath the window apron 12, the guide tube 26 transitions into a laterally slotted guide rail 27. The guide rail 27 in this case essentially is a cylindrical tube having a continuous longitudinal slot 28 on the side that faces the window section 5. The width of the guide rail 27 is equal to the width of the guide tube 26.

The pull rod 18 also has a tubular shape and has a guide element 29 with a guide pin 31. The free end of the guide pin carries a ball 32 of larger diameter that is accommodated in a sliding fashion inside the guide rail 27 and cannot escape through the slot 28.

The thrust element 23 comprises a flexible core 33 and a wire-like helix 34 arranged thereon. The helix 34 is affixed to the core 33 such that an endless screw is formed. The helix serves as a tooth, by which the thrust element acts like a flexible rack with a screw-type thread on all sides. The toothed wheel 22 is adapted to the pitch of the helix 34, with the helix positively engaging with the toothed wheel 22.

The guide rail 27 is rearwardly offset slightly from the window edge 9 such that the entire mechanism is hidden behind the inner trim 13 and only the pull rod 18 extends into the interior of the door through a slot in the inner trim 13. In the region of the rear window edge 11, i.e., in the region of the central strip 4, the other end of the pull rod 18 is guided in the same fashion as shown in FIG. 3 for the front edge.

Figure 4:
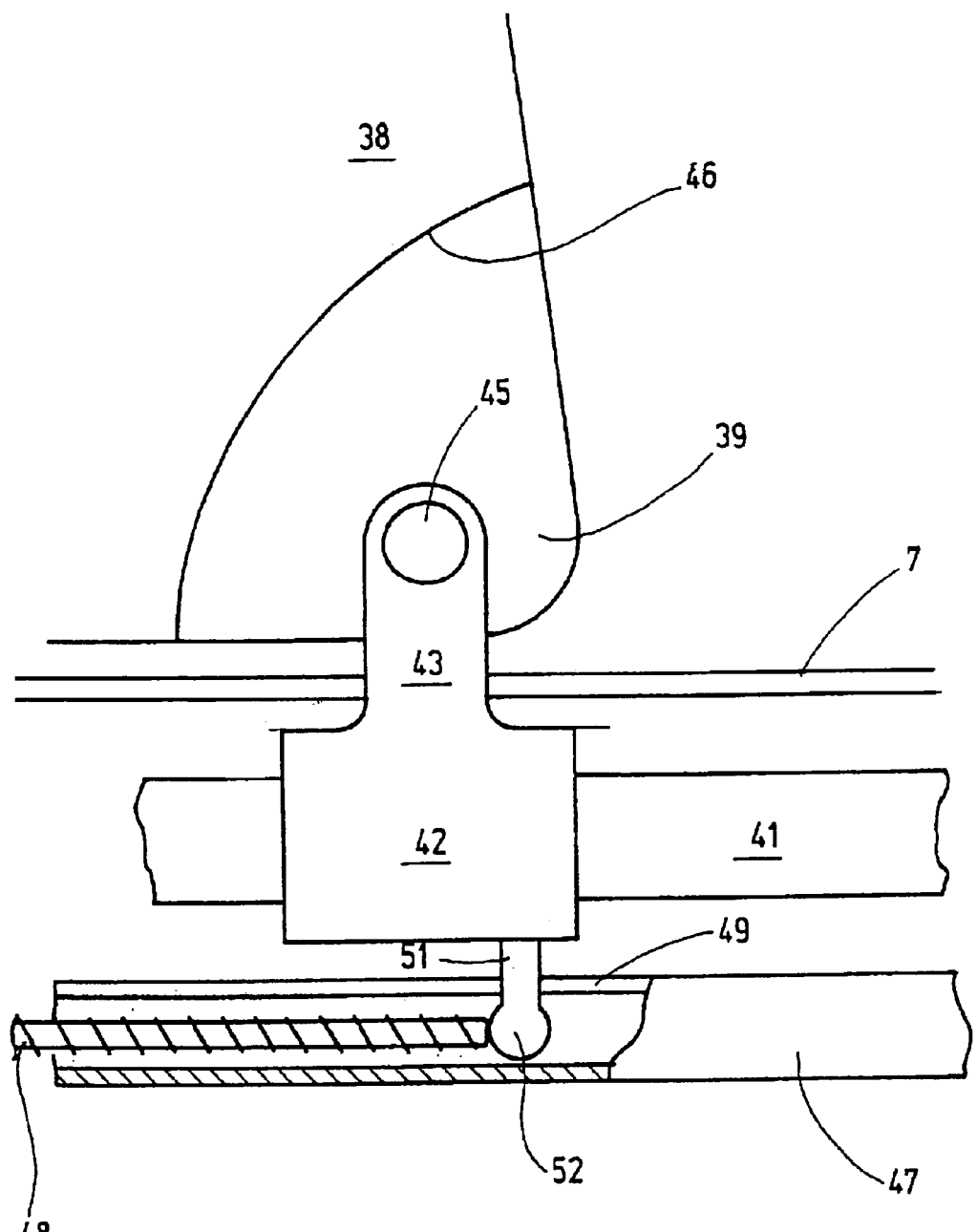
FIG. 4 is an enlarged depiction, in partial section, of the guide and associated slide used for opening the generally triangular-shaped window shade shown in FIG. 2.

Another winding shaft 35, in this case vertically oriented, is rotatably supported between two bearing blocks 36, 37 underneath the trim of the central strip 4. One edge of a second window shade strip 38 is attached to the winding shaft 35. The window shade strip 38 is cut to size in accordance with the shape of the window section 6 and serves to cover the window section 6 when extended. Because the window section 6 has, in the broadest sense, a triangular shape, the window shade strip 38 ends in an acute angled corner 39. Only this acute angled corner 39 of the window shade strip 38 is guided and driven. The two winding shafts 14, 35, hence, extend approximately perpendicular to one another. The window shade strip 38 is wound onto the winding shaft 35 with the aid of a suitable spring drive that is arranged and anchored in similar fashion to the spring drive 15, as depicted in FIG. 4.

In this case, a guide rail 41 on which a slide 42 is guided for freely sliding movement is mounted within the door underneath the window edge 7. The slide 42 carries an upwardly projecting arm 43 that extends out from the interior of the door through a slot 44 in the window apron 12. The free end of the arm 43 is, for example, connected to the corner 39 of the window shade strip 38, which is provided with a reinforcement 46 in the form of a rivet 45.

A guide tube 47, in which another thrust element 48 in the form of a SUFLEX shaft 48 is guided, extends underneath and parallel to the guide rail 41. The guide tube 47 is provided with a continuous longitudinal slot 49 open on top. A pin 51 that carries an integral ball 52 on its free end projects into the guide tube through this slot. The ball 52 is in positive contact with the free end of the thrust element 48.

Underneath the bearing block 37, the guide tube 47 transitions into a non-slotted guide tube 53 that leads to the common driving motor 19. As depicted in FIG. 3, the output shaft of the drive motor not only carries the toothed wheel 22 for driving the two thrust elements 23, 24, but also another toothed wheel 55 for driving the thrust element 48. Since all thrust elements 23, 24, 48 are positively coupled to the respective toothed wheels 22, 55 and both toothed wheels 22, 55 also are connected to one another free of rotational play, positive, slip-free motion of the thrust elements 23, 24, 48 is ensured, which takes place simultaneously.

The double window shade arrangement as described above functions in the following manner:

In the retracted condition, the window sections 5, 6 are uncovered. The two window shade strips 16, 38 are wound on the respective winding shafts 14, 35. The thrust elements 23, 24, 48 are sufficiently retracted from the guide rails 27, 47 to enable the window shade strips 16, 38 to assume their unobstructed positions. In this position, their free edges 17, 39 are situated adjacent to the respective window edges provided with the winding shafts 14, 35.

When a passenger wants to shade the window sections 5, 6, the drive motor 21 is actuated by means of an appropriate control switch. This causes both toothed wheels 22, 55 to rotate in synchronysm at the same speed. Since the two thrust elements 23, 24 are engaged with the teeth of the toothed wheel 22 on diametrically opposite sides, the thrust element 23 is moved toward the left and at the same time the thrust element 24 is moved toward the right. The thrust element 48 is moved in the same direction as the thrust element 24, but with a different speed that corresponds to the difference in diameter between the toothed wheels 22, 55.

After traveling a short distance, the free ends of both thrust elements 23, 24 come in contact with the guide elements 29 of the pull rod 18 and press the pull rod in the direction of the upper window edge 12. During this process, the window shade strip 16 is unwound from the winding shaft 14 against the force of the spring drive 15.

Figure 2:
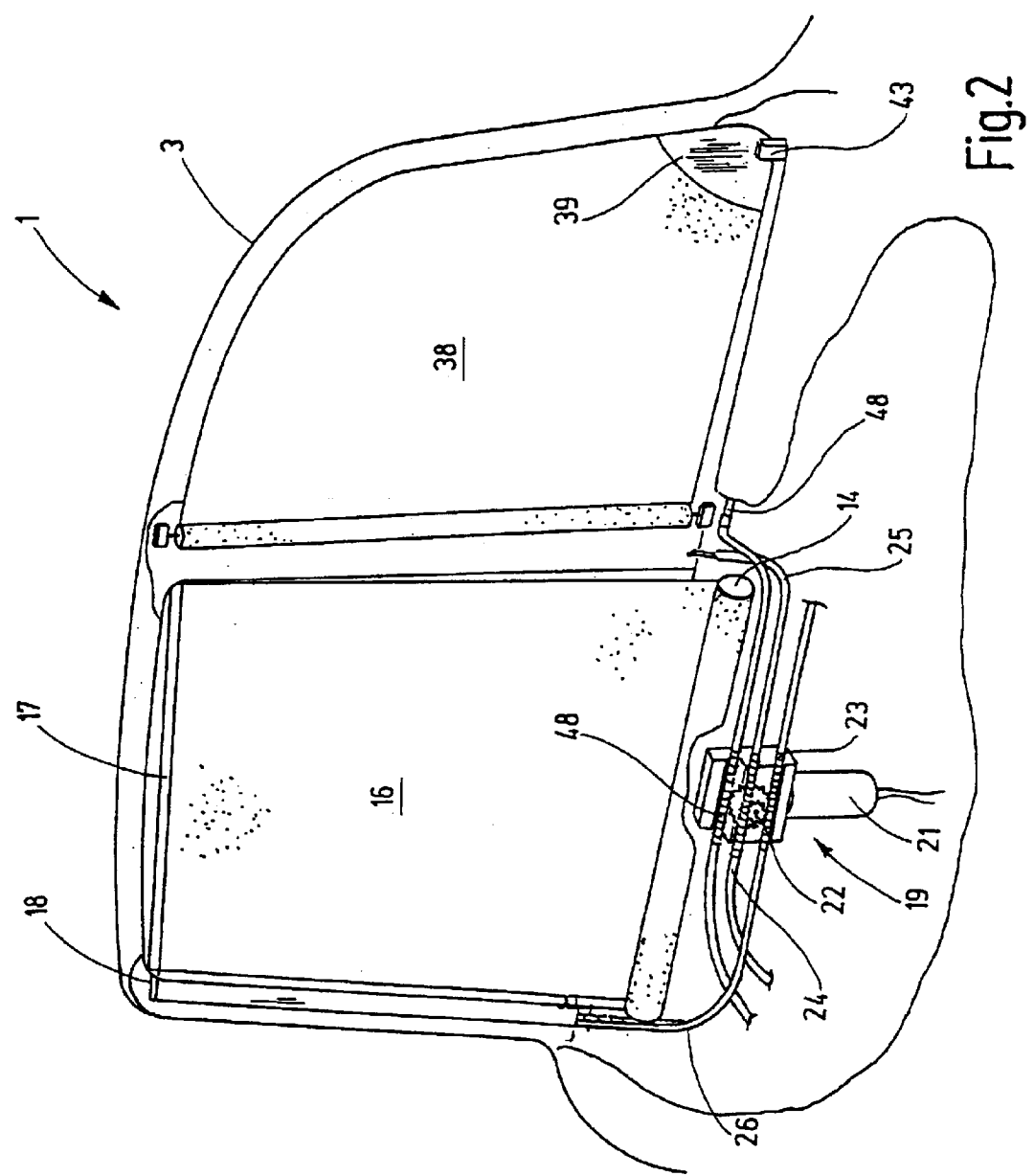
FIG. 2 is a perspective, similar to FIG. 1, but showing the shades in their closed position.

The thrust element 48 is moved simultaneously with the two thrust elements 23, 24. The free end of the thrust element 48 comes in contact with the ball 52 and drives said ball in the direction of the rear edge 8 of the window section 6. This movement is transmitted to the slide 52 and from the slide to the corner 39 of the window shade strip 38. The window shade strip 38 is unwound from the winding shaft 35 against the force of the spring drive provided therein. The end position of the double window shade arrangement is shown in FIG. 2.

The dimensions of all parts are adapted to one another in such a way that both window shade strips 16, 38, reach their end positions simultaneously although the distance to be traveled by the free edge of the window shade strip 38 is, for example, significantly shorter than the vertical distance traveled by the free edge 17 of the window shade strip 16. The difference in the distance to be traveled can be correspondingly obtained by choosing the transmission ratios of the two toothed wheels 22 and 55 accordingly. Alternatively, it would be possible for the thrust element that moves the window shade strip over the shortest distance to travel initially over a correspondingly long idle distance before it makes contact with the respective ball 22, 52 when the respective window shade strip is wound up on the corresponding winding shaft.

For retracting the window shades the drive motor 21 is turned in an opposite rotational direction. The thrust elements 23, 24, 48 are again withdrawn simultaneously from their respective guide tubes 27 and 47.

Since the window shade strips 16, 38 are constantly subjected to the tension of the spring drives in the corresponding winding shafts 14, 35, the window shade strips 16, 38 remain tightly stretched and are wound up onto the winding shafts 14, 35 in accordance with the retraction movement of the thrust elements 23, 24, 48.

Assuming the window shade strip 38 travels a significantly shorter distance, it reaches its retracted position faster than the window shade strip 16 if all thrust elements 23, 24, 48 travel with the same linear speed. At this position, the thrust element 48 that loosely adjoins the ball 52 is decoupled from the ball 52 and is correspondingly retracted far into the respective guide tube until the driving motor 21 is switched off because the window shade strip 16 also has reached its end position.

However, it is preferable to ensure that both window shade strips 16, 38 require approximately the same time for traveling their respective distances. As mentioned above, this can be realized by choosing the transmission ratios accordingly. A possible residual error that is not optically disturbing can be compensated in the form of a corresponding idle distance of the thrust element 23, 24, 48 for the "faster window shade strip." The idle distance can be realized because the thrust elements 23, 24, 48 positively cooperate with the pull rod 18 and the slide 42 in only one moving direction. The functional connection cannot be subjected to tension. The thrust elements are able to arbitrarily decouple during their retraction movement and thus travel an arbitrary idle distance before they contact the pull rod 18 or the slide 42 when the window shade strip is extended.

In order to prevent the unused ends of the thrust elements from becoming twisted or soiled, storage tubes are provided on the side of the drive motor 21 that is situated opposite to the respective guide tubes 25, 26, 53. This is illustrated in an exemplary fashion in the form of the storage tube 53a that accommodates the thrust element 24.

Since the toothed wheel 22 has a slightly larger diameter than the toothed wheel 55 in the embodiment shown, the thrust element 24 is at least partially covered by the thrust element 48. Consequently, only a short section of the thrust element 24 is shown to the right of the thrust element 48. The figure would be unnecessarily complicated by illustrating the thrust elements 24, 48 in their entirety.

Figure 5:
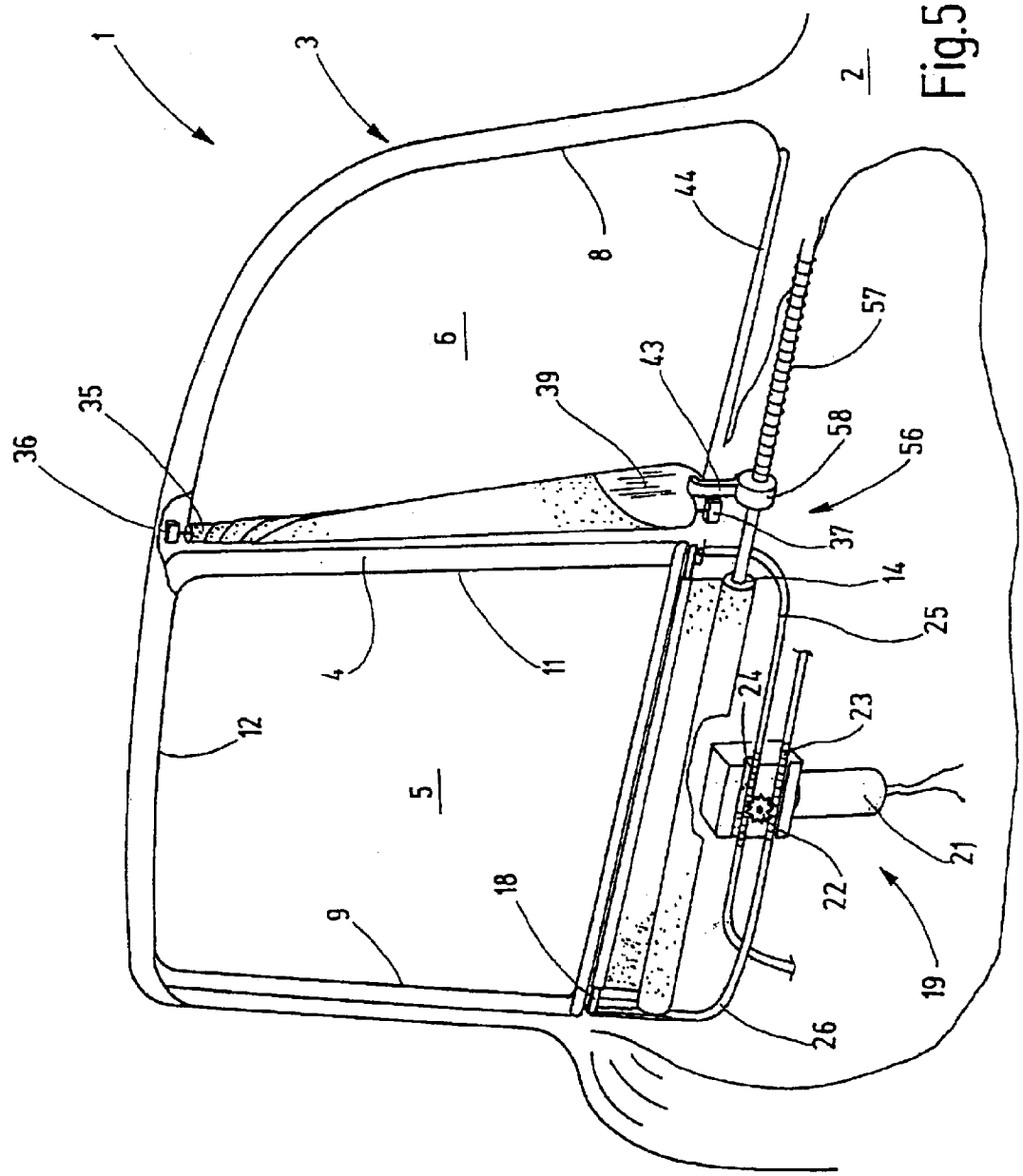
FIG. 5 is a schematic perspective of an alternative embodiment of window shape arrangement in which a winding shaft is coupled to a gear for converting rotational movement of the winding shaft into linear window shade movement.

FIG. 5 shows another embodiment of double window shade arrangement, wherein both window shade strips 16, 38 also are driven by a common drive unit. Previously described components in FIG. 5 are identified by the same reference numerals. These components are not described in detail again because their previous descriptions apply analogously.

The difference from the embodiment according to FIG. 1 can be seen in how the window shade strip 38 is driven in the unwinding direction. In this case, a drive mechanism 56 is provided instead of the thrust element 48 that is driven by the common driving motor 19. The drive mechanism 56 comprises a threaded spindle 57 with a spindle nut 58 situated thereon. The spindle nut carries the arm 43 that is connected to the window shade strip 38 in the same fashion as described above with reference to the embodiment according to FIG. 1.

The threaded spindle 57 is coupled to the winding shaft 14 free of rotational play and extends parallel to and underneath the lower window edge 7. Depending on the installation conditions, the threaded spindle 57 can be rigidly connected to the winding shaft 14. If this is not possible, a universal joint can be arranged between the threaded spindle 57 and the winding shaft 14. In the latter instance, the threaded spindle 57 needs to be rotatably supported at both ends. If a rigid connection is provided, it suffices to rotatably support the threaded spindle 57 on its free end.

The function of the arrangement shown in FIG. 5 is as follows:

In order to extend the window shade strips, the drive motor 19 is actuated such that the two thrust elements 23, 24 are set in motion. As described above, these thrust elements press the pull rod 18 upward such that the winding shaft 14 is set in rotation. The rotation of the winding shaft 14 causes the threaded spindle 47 to also rotate such that the spindle nut 58 is linearly displaced toward the right from the position shown in FIG. 5. The transmission ratio of the threaded spindle 57 can be chosen such that both window shade strips 16 and 38 reach their extended end positions simultaneously.

The double window shade arrangement according to FIG. 5 also is provided with a common drive unit for both window shade strips 16, 38. The common drive unit for both window shade strips, however, is not limited to coupling of the electric drive to the free end of the window shade strip.

Figure 6:
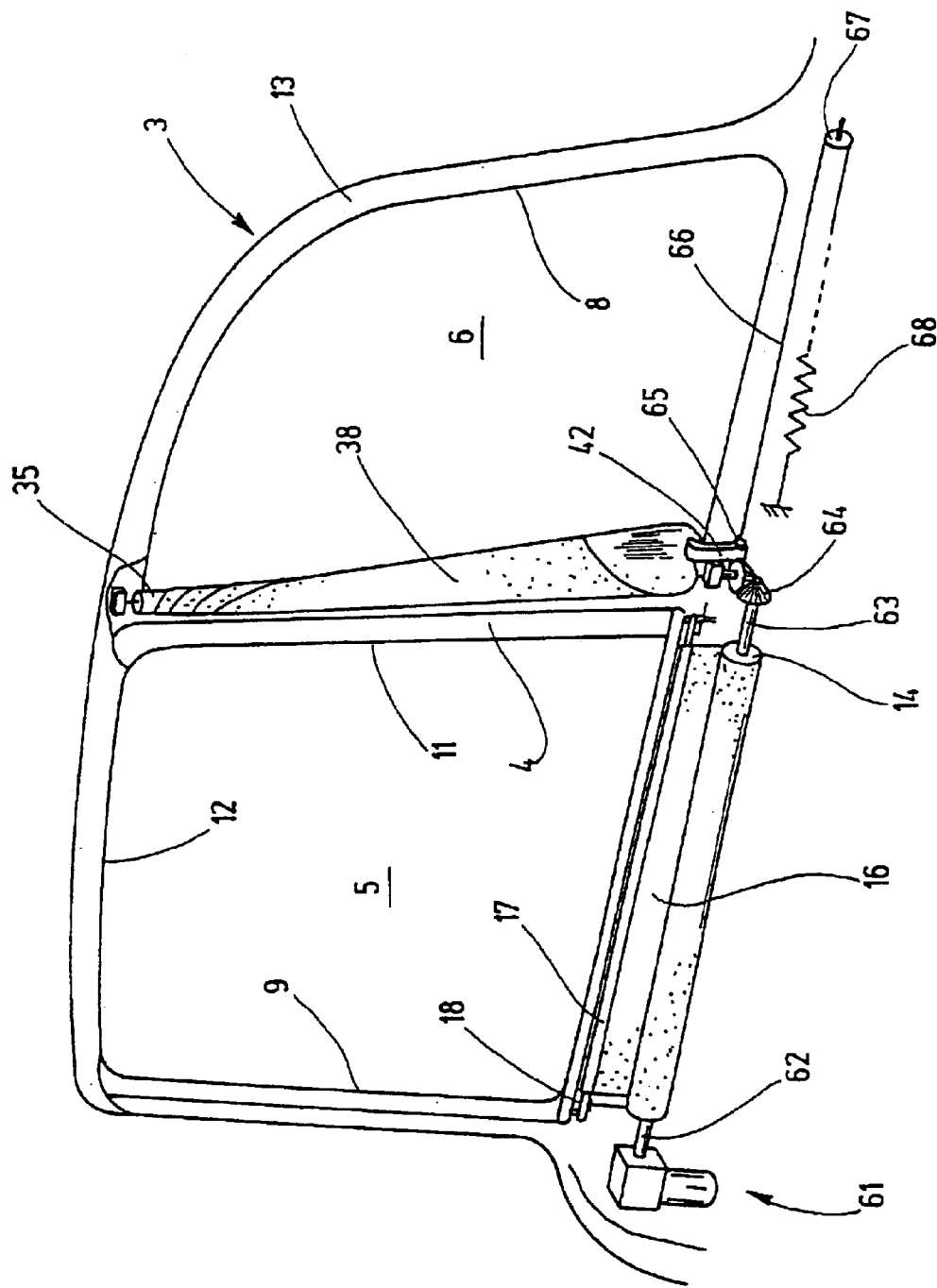
FIG. 6 is a schematic perspective of another alternative embodiment of window shade arrangement in which winding shafts for both windows are driven by a common electric motor.

FIG. 6 also shows an embodiment in which the winding shafts are driven by a common drive motor, wherein components previously described with reference to the embodiments of FIGS. 1 and 6 are identified by similar reference numerals, without repeated description. The drive motor 61 in this instance has an output shaft 62 coupled to the winding shaft 14 free of rotational play and without the spring drive 15 of the previous embodiment. The drive motor 61 is arranged on the end opposite from the winding shaft 35.

The end of the winding shaft 14 opposite the drive motor 61 carries a shaft extension 63 on which a bevel gear wheel 64 is mounted. The bevel gear wheel 64 meshes with a bevel gear wheel 65 fixed to the winding shaft 35. A slide 42, similar to that previously described, is connected to a linear tensioning element in the form of a cord or cable 66. The cable 66 extends around a deflection pulley 67 that is stationarily mounted in the door 1 beyond the travel of the slide 65. The other end of the tension element 66 is subjected to the force of a tension spring 68 anchored in the door 1. A similar arrangement consisting of a cable, a spring and a deflection pulley can be used for pre-tensioning the pull rod 18 on both ends in the direction away from the winding shaft 14.

This window shade arrangement functions in the following manner:

In order to extend the two window shade strips 16, 38, the drive motor 61 is switched on such that it rotates in the direction in which the window shade strip 16 is unwound from the winding shaft 14. This rotational movement is simultaneously transmitted to the winding shaft 35 by means of the angle drive consisting of the two bevel gear wheels 64, 65. Since the free end of the window shade strip 38 is pre-tensioned by the tension element 66 and the tension spring 68, the slide 42 moves toward the rear edge 8 of the window section 6.

The pull rod 18, as indicated above, is pre-tensioned on both ends by tension means and tension springs corresponding to the tension means 66 and the tension spring 68. The window shade strip 16 is extended in front of the window section 5 to the degree that the winding shaft 14 releases the window shade strip 16. In this embodiment, a common electric drive again is provided for both window shade strips.

It will be understood that the position of the drive motor 61, which is schematically indicated in FIG. 6, alternatively could be arranged between the winding shaft 14 and the bevel gear wheel 64. The output shaft of the drive motor 61 also could be engaged with the bevel gear wheel 64 by means of another bevel gear wheel.

From the foregoing, it can be seen that only one electric drive need be used for moving both window shade strips in different directions in the double window shade arrangement shown. The utilization of a single electric motor is not only more economical, but also is important with respect to the space saving within the door. The drive motor occupies space and can conflict with door braces, window actuating mechanisms, door locking mechanisms, air outlet vents and ducts, as well as possible retention systems and injury protection devices, e.g., airbag systems and the like. For this reason, the reduction in the number of drives, and consequently the space occupied by these drives, is very advantageous.

Hence, it can be seen that the invention provides a double window shade arrangement for a divided window of a motor vehicle that has two separate winding shafts that are arranged relative to one another on the window at arbitrary angles. The window shade strips assigned to the respective winding shafts are moved with the aid of a common driving motor, at least in one direction. For this purpose, the electric motor can be coupled to the free edges of the window shade strips or directly to the winding shafts.

What is claimed is:

1. In an automobile having two windows sized and configured differently from each other, a window shade arrangement comprising a first winding shaft (14, 35) rotatably supported adjacent a window edge (7), a first window shade strip (16, 38) shaped to conform generally to a first one of said windows and having one end attached to said first winding shaft (14, 35) and a free edge (37, 39) that can be moved away from the first winding shaft (14, 35), a second winding shaft (14, 35) rotatably supported adjacent to another window edge (7), a second window shade strip (16, 38) shaped to conform generally to a second of said windows and differently from said first window shade strip, said second window shade strip (16, 38) being attached to said second winding shaft (14, 35) and having a free edge (17, 39) that can be moved away from the second winding shaft (14, 35), a single drive unit (19, 61) operatively coupled to each of said window shade strips (16, 39) for moving said window shade strips (16, 38) in at least one direction in response to operation of the drive unit (19,61) into respective overlying relation with said two windows, and said drive unit being operable for moving one of said window shade strips a greater distance than the other of said window shade strips.

2. In the automobile of claim 1 in which said drive unit (19) is operable for moving said window shade strips (16, 38) in a direction in which they are unwound from the respective winding shafts (14, 35).

3. In the automobile of claim 1 in which said drive unit (19) is operatively connected to a free edge (17, 39) of each window shade strip (16, 38).

4. In the automobile of claim 1 in which each said winding shaft (14, 15) is rotatable in an unwinding direction in response to movement of the window shade in an extended window closing position and in a wind up direction during movement of said window shade in a retracting window opening position, and each said winding shaft (14, 35) has an associated drive spring (15) for biasing the winding shaft in the wind up direction.

5. In the automobile of claim 1 in which the drive unit includes least one flexible linear actuating element (22, 23, 48, 66) for the first window shade strip (16, 18) that engages the free edge (17, 39) of the first window shade strip and another flexible linear actuating element (22, 23, 48, 66) that engages the free edge of the second window shade strip (16, 38).

6. In the automobile of claim 5 in which at least one of the actuating elements (22, 23, 48, 66) of one of the window shade strips (16, 38) is movable in response to operation of said drive unit (19).

7. In the automobile of claim 5 in which the actuating element (22, 23, 48) for at least one window shade strip (16, 38) is guided for movement without buckling with a free end of the thrust elements engaging the free edge (17, 39) of the one window shade strip (16, 38).

8. In the automobile of claim 5 in which the free edge of each window shade strip is movable in one direction a second from the respective winding shaft (14, 15) and in an opposite direction during movement toward the respective winding shaft, and each actuating element (22, 23, 48) positively cooperates with the free edge of the respective window shade strip (16, 38) in only one direction of movement.

9. In the automobile of claim 5 which each of the actuating elements (22, 23, 48) are guided for movement without buckling.

10. In the automobile of claim 1 in which said drive unit (19) is operable for rotating both winding shafts (14, 15) in a direction in which the respective window shade strip is unwound from its winding shaft.

11. In the automobile of claim 1 in which the drive unit (61) is operable for turning the winding shafts (14, 35) in a direction in which the respective shade strips (16, 38) are wound up upon the winding shafts.

12. In the automobile of claim 11 in which the drive unit (61) for the first and second winding shafts (16, 38) includes a common electric motor.

13. In the automobile of claim 12 in which the two winding shafts (14, 35) are coupled by a drive element (64, 65) in angled relation to each other.

14. In the automobile of claim 1 in which the two winding shafts (14, 35) extend in non-parallel relation to each other.

15. In the automobile of claim 1 in which one winding shaft (14, 35) is mountable adjacent an edge (7) of one window section (5, 6) and the other winding shaft (14, 35) is mountable adjacent an edge (7) of another window section (5, 6).

16. In the automobile of claim 1 in which said drive unit is operable for decoupling from one of said window shade strips for enabling the other of said window shade strips to move a greater distance than said one window shade strip.

17. In the automobile of claim 1 in which said drive unit is operatively coupled to said window shade strips through respective actuating elements (22, 23, 48), and said drive unit (19) having an output shaft with two toothed wheels (22, 55) of different effective diameters, one of said toothed wheels being engaged with one of said actuating elements for moving said first window shade strip as an incident to operation of said single drive unit, and the other toothed wheel being engaged with the actuating element of the second window shade strip for moving the second window shade strip as an incident to operation of said single drive unit.

18. In a motor vehicle having windows, a window shade arrangement comprising a first winding shaft (14, 35) rotatably supported adjacent a window edge (7), a first window shade strip (16, 38) having one end attached to said first winding shaft (14,35) and a free edge (37, 39) that can be moved away from the first winding shaft (14, 35), a first rewind drive unit 15 for turning the first winding shaft (14, 35) in a direction in which the first window shade strip (16, 38) is wound up on the winding shaft, a second winding shaft (14, 35) rotatably supported adjacent to another window edge (7), a second window shade strip (16, 38) attached to said second winding shaft (14, 35) and having a free edge (17, 39) that can be moved away from the second winding shaft (14, 35), a second rewind drive unit 15 for turning the second winding shaft (14, 35) in a direction in which the second window shade strip (16, 38) is wound up on the winding shaft, a single power drive unit (19) that cooperates with the free edge (17, 39) of only one window shade strip (16, 38) in order to unwind the window shade strip (16, 38) from its corresponding winding shaft (14, 35), and a drive mechanism (56) connected to the winding shaft (14, 35) for the window shade strip (16, 38) with which the single power drive unit (19) cooperates for transforming rotational movement of the winding shaft (14, 35) into linear movement of an output element (38) coupled to the free edge (17, 38) of the other window shade strip (16, 38) for enabling free edges of said window shade strips to be simultaneously moved away from their respective winding shafts as an incident to operation of said single power drive unit.

19. In the automobile of claim 18 in which the drive unit (19) for the first window shade strip (16, 38) includes at least one flexible, linear actuating element (23, 24) that engages the free edge (17, 39) of the first window shade strip (38).

20. In the automobile of claim 18 in which the two winding shafts (14, 35) extend in non-parallel relation to each other.

21. In the automobile of claim 18 in which the two winding shafts (14, 38) are arranged at an angle to each other of about 90°.

22. In the automobile of claim 18 in which one said winding shaft (14, 35) is mountable adjacent an edge of one window section (5, 6) and the other winding shaft (14, 35) is arranged adjacent the edge of a second window section (5, 6).

23. In a motor vehicle having windows, a window shade arrangement comprising a first winding shaft (14, 35) rotatably supported adjacent a window edge (7), a first window shade strip (16, 38) having one end attached to said first winding shaft (14, 35) and a free edge (37, 39) that can be moved away from the first winding shaft (14, 35), a second winding shaft (14, 35) rotatably supported adjacent to another window edge (7), a second window shade strip (16, 38) attached to said second winding shaft (14, 35) and having a free edge (17, 39) that can be moved away from the second winding shaft (14, 35), a single drive unit (19, 61) operatively coupled to each of said window shade strips (16, 39) for moving said window shade strips (16, 38) in at least one direction in response to operation of the drive unit (19,61), said drive unit being decoupleable from one of said window shade strips (16, 19) during movement of the window shade strip in at least one direction so as to enable the drive to move the other of window shade strips a greater distance than the one window shade strip.

24. In the automobile of claim 23 in which the drive unit (19) has an output shaft with two toothed wheels (22, 55), one of said toothed wheels being engaged with the actuating element (22, 23, 48) of the first window shade strip (16, 38) and other toothed wheel being engaged with the actuating element (22, 23, 48) of the second window shade strip (16, 38).

25. In the automobile of claim 24 in which the toothed wheels (22, 55) have different diameters.

26. In the automobile of claim 23 in which the free edge of each window shade strip is movable in an extended direction away from the respective window shade shall and a retracted direction toward the respective window shade shaft, and said drive unit is decoupleable from said one window shade strip as in incident to movement of the window shade strip in a retracted direction.

27. In a motor vehicle having windows, a window shade arrangement comprising a first winding shaft (14, 35) rotatably supported adjacent a window edge (7), a first window shade strip (16, 38) having one end attached to said first winding shaft (14, 35) and a free edge (37, 39) that can be moved away from the first winding shall (14, 35), a second winding shalt (14, 35) rotatably supported adjacent to another window edge (7), a second window shade strip (16, 38) attached to said second winding shaft (14, 35) and having a free edge (17, 39) that can be moved away from the second winding shaft (14, 35), a single drive unit (19, 61) operatively coupled through actuating elements (22, 23, 48) to each of said window shade strips (16, 39) for moving said window shade strips (16, 38) in at least one direction in response to operation of the drive unit (19, 61), said drive unit (19) having an output shaft with two toothed wheels (22, 55) of different effective diameters, one of said toothed wheels being engaged with one of said actuating elements for moving said first window shade strip as an incident to operation of said single drive unit, and the other toothed wheel being engaged with the actuating element of the second window shade strip for moving the second window shade strip as an incident to operation of said single drive unit.

28. In the automobile of claim 27 in which the window shade strips (16, 38) are movable to a retracted position wound up on its respective winding shaft (14, 35), and said drive unit (19) is decoupleable from the window shade strips (16, 19) during movement of the window shade strips (16, 38) to the retracted positions.

29. In an automobile having two windows sized and configured differently from each other, a window shade arrangement comprising a first winding shaft (14, 35) rotatably supported adjacent a window edge (7), a first window shade strip (16, 38) shaped to conform generally to a first one of said windows and having one end attached to said first winding shaft (14, 35) and a free edge (37, 39) that can be moved away from the first winding shaft (14, 35), a second winding shaft (14, 35) arranged at an angle of about 90° to the first winding shaft (14, 35) and rotatably supported adjacent to another window edge (7), a second window shade strip (16, 38) shaped to conform generally to a second of said windows and differently from said first window shade strip, said second window shade strip (16, 38) being attached to said second winding shaft (14, 35) and having a free edge (17, 39) that can be moved away from the second winding shaft (14, 35), and a single drive unit (19, 61) operatively coupled to each of said window shade strips (16, 39) for moving said window shade strips (16, 38) in at least one direction in response to operation of the drive unit (19,61) into respective overlying relation with said two windows.

* * * * *